United States
Glenn

3,700,307
Oct. 24, 1972

[54] ADJUSTABLE NONLINEARLY TRANSMISSIVE OPTICAL DEVICE

[72] Inventor: William H. Glenn, Vernon, Conn.

[73] Assignee: United Aircraft Corporation, East Hartford, Conn.

[22] Filed: April 5, 1971

[21] Appl. No.: 131,327

[52] U.S. Cl. .................................. 350/157, 350/147
[51] Int. Cl. .................................................. G02f 1/24
[58] Field of Search .............. 350/147, 150, 157, 160

[56] References Cited

UNITED STATES PATENTS 3,432,223    3/1969    Uchida ...................... 350/157

OTHER PUBLICATIONS

Maker et al., " Intensity- Dependent Changes in the Refractive Index of Liquids" Phys. Rev. Lett. Vol. 12, No. 18 (May 4, 1964) pp. 507– 509

McWane et al., " New Measurements of Intensity–Dependent Changes in the Refractive Index of Liquids" App. Phys. Lett. Vol. 8, No. 11 (June 1, 1966) pp. 278– 279

*Primary Examiner*—David Schonberg
*Assistant Examiner*—Paul R. Miller
*Attorney*—Anthony J. Criso

[57] ABSTRACT

A nonlinear optical device which is useful because of its intensity-dependent transmissivity characteristic for Q switching or mode locking lasers and also as an optical limiter is disclosed. A combination of adjustable optical elements each of which causes a known effect on the polarization of radiation passing therethrough forms the device; one of these elements is a dielectric material which rotates the major axis of elliptically polarized radiation in an amount proportional to the intensity of the radiation, producing an intensity sensitive transmissive characteristic. The saturation parameters of the devices are variable and devices having either a saturable absorber or a saturable transmitter characteristic are described.

4 Claims, 3 Drawing Figures

Patented Oct. 24, 1972

3,700,307

INVENTOR
WILLIAM H. GLENN

BY Anthony J. Criso
ATTORNEY

ADJUSTABLE NONLINEARLY TRANSMISSIVE OPTICAL DEVICE

BACKGROUND OF THE INVENTION

1. Field of the Invention

This invention relates to the modification of a field of electromagnetic radiation by a polarization sensitive device having nonlinear transmissive characteristics and more particularly to the modification of a radiation field of an optical beam by a nonlinearly transmissive optical device. The invention herein described was made in the course of or under a contract or subcontract thereunder with the Department of the Air Force.

2. Description of the Prior Art

In the past, various non-linear materials called bleachable dyes have been developed, particularly for use with lasers. The most common use for these materials is with optical radiation (any electromagnetic radiation having a wavelength very much smaller than the characteristic dimensions of the physical objects involved) as a saturable absorber or as a saturable transmitter. A bleachable dye generally comprises an organic molecule such as cryptocyanine, various phthalocyanines and Eastman Kodak 9740 and 9860, suspended in a solid or liquid host such as ethanol, chlorobenzene, dichloroethane, or polymethylmethacrylate, and has a useful absorption characteristic at the wavelength corresponding to that of an incident laser. For example, in a Q switching application a dye cell is placed in a laser cavity containing a gain medium. When the cavity gain exceeds its losses, the laser intensity increases causing an increased transmissivity through the dye cell; as the intensity increases, the cavity losses decrease and effectively increase the gain of the cavity. The higher gain causes a still further increased intensity, which repeats the indicated sequence and the net result is a Q switched laser. There is an analogous descriptive model for the mode locking of lasers although the exact mechanisms involved are not as clearly understood; as a laser pulse passes through a dye, the transmissivity of the dye increases and this increased transmissivity persists for a period after the pulse has left the dye. To mode lock a laser, the persistence of the increased transmissivity must be minimized and in any case, the persistance cannot exceed the time a light pulse requires to make a round trip through the cavity involved.

One of the drawbacks presently limiting the usefulness of the known bleachable dyes in laser work is the relatively narrow span of wavelengths over which a dye is useful; more specifically, a particular dye must be selected for each different laser since these materials exhibit their nonlinear characteristics over a relatively limited wavelength span.

Further, many of the known dyes having nonlinear properties have been found to be chemically unstable; for example, the dye may undergo chemical change due to ambient light or laser light impingement and therefore exhibit a relatively short storable lifetime and/or a relatively short useful lifetime.

Also, many of the dyes under consideration are expensive to use. The actual chemical compositions of some of the commonly used dyes are known only by the manufacturers of these products, and the persons using such dyes cannot prepare them from staple chemical supplies but must purchase them already fully prepared.

A severe limitation in the use of known bleachable dyes occurs because the optical properties of such dyes cannot be readily changed. For example, each saturable absorber has a characteristic saturable intensity (the intensity at which the absorption coefficient is reduced to one-half the value at zero intensity) which is dependent upon the dye molecule and the dye solvent and therefore is not easily varied once a given dye is prepared.

Nonlinear optical devices are used as both absorbers and transmitters of electromagnetic radiation. As is known in the art, a saturable absorber produces a transmissivity which increases with increasing intensity of the radiation due to an equalization of the population in the upper and lower energy states corresponding to the absorption line. Correspondingly, a saturable transmitter provides a transmissivity which decreases with increasing intensity of the radiation, due to the population of the excited energy states of the medium which exhibit a larger absorption than the ground energy state.

SUMMARY OF THE INVENTION

A principle object of the present invention is to provide an optical device which has an adjustable transmissivity of electromagnetic radiation which is intensity-dependent.

According to the present invention, a dielectric material which rotates the polarization ellipse of an elliptically polarized wave in an amount dependent upon the intensity of the wave, is combined with polarizers and wave retardation plates to provide an optical device having transmissive characteristics which are both nonlinear with respect to incident electromagnetic radiation intensity and adjustable over a range of possible variations. In one preferred embodiment, the present invention is a transmission device in which a linearly polarized input beam of electromagnetic radiation is passed in sequence through a first wave plate, a dielectric material, a second wave plate, and a polarizer to produce a linearly polarized output beam. A second preferred embodiment is a reflection device in which an input beam of electromagnetic energy having any polarization characteristic is passed through the above-described preferred embodiment in the reversed direction before striking a mirror and being reflected back to repass through the same components and produce a linearly polarized output beam exiting said polarizer.

A principal advantage of the present invention is the ability to vary the transmissivity in a given nonlinear optical device; once a dielectric material is selected, the functional dependence of the transmissivity of the overall device on the intensity of the electromagnetic radiation passing therethrough can be varied over a wide range of characteristic forms (shape of the curve which defines the transmissivity of the device versus intensity characteristic of the electromagnetic radiation). Also, this invention can function as a saturable absorber, as a saturable transmitter, or as a device having characteristics between both of these. Another advantage of the present invention is its applicability to incident radiation having a wide range of wavelengths; for example, the present invention is usable with any laser having a wavelength for which the components of the device are transparent. This is not to imply that the same device is transferable between lasers of different wavelengths since (it has to be adjusted) the wave plates are selected for each particular wavelength.

A feature of the present invention is its chemical stability; this device has an indefinite lifetime for both storage and use.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Various nonlinear optical effects including the saturation of an absorbing transition and the production of an induced absorption can provide intensity-dependent transmission properties in selected materials. One such nonlinear effect is exploited in this invention and it relies on the intensity-dependent rotation experienced by the polarization ellipse of an elliptically polarized electromagnetic wave being propagated through certain dielectric materials.

The operation of this invention in all its embodiments relies on this intensity-dependent rotation of an elliptically polarized wave. The liquid materials of most interest include such materials as carbon disulfide, nitrobenzene and chlorobenzene and can be characterized as materials comprised of asymmetric or cigar-shaped molecules which respond to a polarized wave passed therethrough by orienting their asymmetry about a common axis. Alignment of the molecules changes the index of refraction of such dielectrics and the degree of alignment (and therefore the degree of change in index of refraction) depends on the intensity of the wave. Thus, in an appropriate dielectric, the overall effect is a material which not only exhibits an anisotropic index of refraction but also an index of refraction which changes with a change in the intensity of an electromagnetic wave transmitted therethrough.

In a typical cell containing a dielectric liquid, the index of refraction is not the same for right-hand and left-hand circularly polarized light and the transmission of elliptically polarized radiation through such a cell causes the major axis of the ellipse to rotate. The rotation is proportional to the product of the electric fields along the principal axis of the polarization ellipse and the length of the liquid cell, and the direction in which this ellipse is rotated is dependent upon the sense of rotation of the ellipse.

Figure 1:
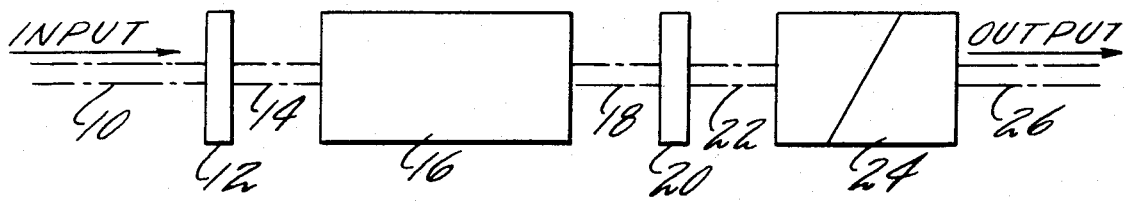
FIG. 1 is a simplified diagram of a nonlinear optical transmission device in accordance with the present invention.

The phenomenon of intensity-dependent rotation of a polarization ellipse has been analyzed theoretically by Maker, P.D. and Terhune, R.W., in Study of Optical Effects Due to an Induced Polarization Third Order in the Electric Field Strength, Physical Review 137, A801, (1965), and demonstrated experimentally by Maker, P.D., Terhune, R.W., and Savage, C.M., as described in Intensity-Dependent Changes in the Refractive Index of Liquids, Physical Review Letters 12,507 (1964). Under the conditions described in these materials, the angle of rotation of the polarization ellipse, $\alpha$, is given by the relationship $$\alpha = 2(\pi\omega)/(cn) B E_x E_y L \qquad (1)$$

where
- $\omega$ equals the frequency of the input optical radiation,
- $c$ is the velocity of light, $n$ is the index of refraction of the dielectric,
- $B$ is a constant characteristic of the non-linearity of the index of refraction of the dielectric,
- $E_x$ is the component of electric field along one of the principal axes of the vibrational ellipse,
- $E_y$ is the component of the electric field along the other of the principal axes of the vibrational ellipse, and
- $L$ is the length of the dielectric A nonlinear optical transmission device is shown in FIG. 1 wherein a linearly polarized source or input beam 10 passes through a wave plate 12 which converts the linearly polarized input into an elliptically polarized beam 14. The beam 14 continues through a liquid cell 16 and interacts with the liquid contained therein, causing the polarization axis of the beam 14 to rotate and egresses the liquid cell as an elliptically polarized beam 18, which has a different direction of orientation but the same degree of ellipticity as the beam 14. The beam 18 is transmitted through a second wave plate 20 and emerges as a beam 22 which may be elliptically, circularly or even linearly polarized depending upon the characteristics of both the beam 18 and the wave plate 20. The beam passes through a linear polarizer 24, and emerges as an output beam 26 which is linearly polarized along the allowed axis of polarization of the polarizer 24. A transmission device of the type described is generally used outside of a laser optical cavity.

If it is assumed that in FIG. 1 the wave plates 12 and 20 are quarter wave plates and that the wave plate 12 has its fast axis oriented at an angle $\theta_1$ to the direction of polarization of the input beam 10, that the wave plate 20 has its fast axis oriented at an angle $\theta_2$ to the direction of polarization of the input beam 10, and that the polarizer 24 is oriented with its allowed axis at an angle $\theta_3$ to the direction of polarization of the beam 10, the expression for the input beam transmissivity ($T$) through such a device is given by $$T = \cos^2(\theta_3 - \theta_2 - \theta_1)\cos^2(\theta_2 - [\alpha' + \theta_1]) + \sin^2(\theta_3 - \theta_2 + \theta_1)\sin^2(\theta\pi t_2 - [\alpha' + \theta_1]), \qquad (2)$$

where $$\alpha' = ((2\pi)^2)/(\lambda) L B E^2_o \sin 2\theta_1 \qquad (3)$$

and
$E_o$ is the amplitude of the electric field of the incident radiation beam, and $\lambda$ is the wavelength of the input beam.

Thus, for an optical device assembled in accordance with the present invention, reorientation of the polarizer 24 or of the fast axis of either of the wave plates 12 and 20 will accordingly change the transmissivity of the device in an amount which is predetermined by the extent of the reorientation.

Figure 2:
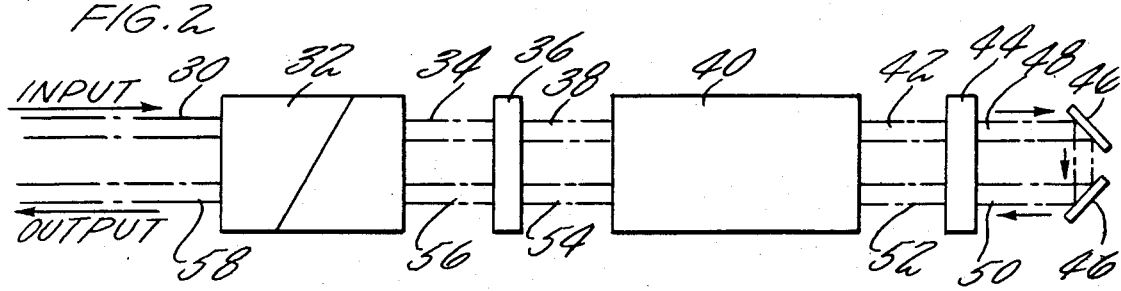
FIG. 2 is a simplified schematic diagram of a nonlinear optical reflection device in accordance with the present invention.

Referring to FIG. 2 wherein a nonlinear optical reflection device is shown in schematic form, an input beam 30 passes through a linear polarizer 32 emerging as a beam 34 which is linearly polarized along the allowed axis of the polarizer 32. The beam 34 passes through a wave plate 36 emerging as an elliptically polarized beam 38 which then passes through a liquid cell 40 emerging as a beam 42 which has the same degree of ellipticity as the beam 38 although the direction of the major axis is different. The beam 42 passes through a second wave plate 44 striking a mirror assembly 46 as a beam 48 and is reflected as a beam 50; the mirror assembly may in fact be one mirror. The beam 50 passes through the wave plate 44 emerging as a beam 52 which may be circularly, elliptically or linearly polarized. The beam 52 passes through the liquid cell 40 emerging as a beam 54 which will be elliptically polarized if the input beam 52 had been elliptically polarized; alternatively if the input beam 52 was circularly or linearly polarized the output beam 54 would be correspondingly circularly or linearly polarized. The beam 54 passes through the wave plate 36 emerging as a beam 56 whose polarization properties depend on the precise properties of the input beam 54 and the wave plate 36. The beam 56 passes through the polarizer 32 emerging as an output beam 58 which is linearly polarized along the allowed axis of the polarizer 32. Although the beam path from left to right is shown as physically separated from the beam path going from right to left in FIG. 2, these beam paths can and do overlap. A reflection device of the type just described is typically used inside a laser optical cavity with the mirror 46 functioning as one of the cavity mirrors.

Assuming that in the reflection device shown in FIG. 2 the wave plates 36 and 44 are quarter wave plates, that the input beam 30 is linearly polarized along the allowed axis of the polarizer 32, that the fast axis of the wave plate 36 is at an angle $\theta_1$ to the direction of polarization of the input beam 30, and that the fast axis of the wave plate 44 is at an angle $\theta_2$ to the direction of polarization of the input beam 30, then the reflectivity ($R$) is given by the equation $$R = 1 - \cos^2 2\theta_1 \sin^2 2(\theta_2 - \alpha'' - \theta_1) \quad (4)$$

where $$\alpha'' = ((2\pi)^2)/(\lambda) L B E_o^2 \sin 2\theta_1. \quad (5)$$

By analogy to the example given for the transmission device described by Equation (2), it should be apparent that reorientation of the fast axis of either of the wave plates 36 or 44 results in a correspondingly predeterminable change in reflectivity.

The transmissivity of nonlinear optical devices in accordance with the present invention is a function of the intensity of the input beam; this intensity dependency is reflected in Equations (2) and (4), both of which incorporate $\alpha$ which is also intensity-dependent as is indicated in Equations (3) and (5), respectively. The transmissivity of these devices is further dependent upon the orientation of the wave plates and the polarizers as is reflected in Equations (2) and (4). In any given system, a wide range of transmissivity versus intensity characteristics is available by appropriate selection of the various orientation angles.

To illustrate a specific system, refer to the transmission device as shown in FIG. 1. With the various orientations set such that $$\theta_3 - (\theta_1 + \theta_2) = 0, \quad (6)$$

the transmissivity ($T$) is given by the equation $$T = 1 - \cos^2 2\theta_1 \sin^2(\theta_2 - [\alpha + \theta_1]). \quad (7)$$

Figure 3:
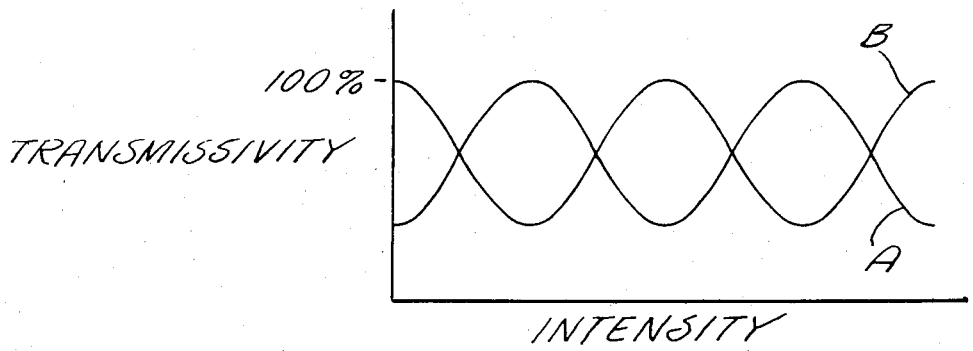
FIG. 3 is a plot for both a nonlinear saturable absorber and transmitter, of the transmissivity as a function of intensity of an incident beam of electromagnetic radiation in accordance with the present invention.

The nonlinear variation in transmissivity of devices assembled according to the present invention is a periodic function (as shown in FIG. 3), although only the first cycle would generally be utilized.

A transmission device having saturable absorber type characteristics, as illustrated in FIG. 3 by Curve A, can be realized if the orientations are such that $\theta_2 - \theta_1 = (\pi)/(2a)$.

Similarly, a transmission device having saturable transmitter characteristics, as illustrated in FIG. 3 by Curve B, can be realized if the orientations are such that $\theta_2 - \theta_1 = 0$. Characteristic forms intermediate the saturable transmitter and the saturable absorber can be realized by variations in the orientations $\theta_1$ and $\theta_2$.

It should be evident that a wide range of transmissivity characteristics can be obtained for both saturable absorber and saturable transmitter devices by alternate choices of the orientation of the optical elements and the length of the liquid cell. The maximum and minimum transmissivity, the periodicity, and the location of the maximum and minimum with respect to the zero of intensity can be adjusted as desired.

There is a corresponding degree of freedom with respect to reflection devices as has been illustrated above with respect to transmission devices.

As an example of the magnitude of the electric fields typically required to produce a transmissivity change, the quantity $\alpha$ as given in Equation (1) is calculated as follows. From data published by P.D. McWane and D.A. Sealer, New Measurements of the Intensity Dependent Changes in the Refraction Index of Liquids, Applied Physics Letter 8, p.278–279, 1 June 1966, $$B = 5.25 \times 10^{-12} \text{cm}^3/\text{erg}$$

for carbon disulfide at a wavelength of 6943 A. Assuming a cell length of one centimeter, then from Equation (1)

$$\alpha = \left[\frac{(2\pi)^2 \times 5.25 \times 10^{-12}}{.69 \times 10^{-4}} \frac{E_o^2}{\sin 2\theta_1}\right] = 3 \times 10^{-6} \frac{E_o^2}{\sin 2\theta_1}$$

Assuming further that $\theta_1 = 22.5°$, then $$\alpha = 6 \times 10^{-6} EE^2_o.$$

Since the transmissivity of the transmission device is periodic in $\alpha$ with a period of $\pi$, the field required to cover one period of the characteristic is $$E_o^2 = (\pi)/(6) \times 10^6 \text{ and}$$

$$E_o = 0.72 \times 10^3 \text{ stat volts/cm}.$$

which corresponds to a power level of approximately 60 Megawatts/cm², typical of the saturation intensity of conventional saturable absorbers.

Although the invention has been described with respect to preferred embodiments thereof, it should be understood to those skilled in the art that the foregoing and other changes in the form and detail thereof can be made therein without departing from the spirit and the scope of the invention.

Having thus described typical embodiments of my invention, that which I claim as new and desire to secure by Letters Patent of the United States is:

1. An optical device which transmits an input beam of linearly polarized electromagnetic radiation and has a transmissivity characteristic which is a function of the intensity of the input beam comprising:

a first quarter wave plate with its fast axis oriented at an angle $\theta_1$ to the direction of polarization of the input beam for producing from the input beam an elliptically polarized beam having a particular orientation;

a liquid dielectric material which rotates the orientation of said elliptically polarized beam by an angle $\alpha$ producing a rotated elliptically polarized beam;

a second quarter wave plate with its fast axis oriented at an angle $\theta_2$ to the direction of polarization of the input beam for producing a second linearly polarized beam from said rotated elliptically polarized beam; and a linear polarizer oriented with its allowed axis at an angle $\theta_3$ to the direction of polarization of the input beam which passes only that component of the second linearly polarized beam which lies along the allowed axis so that said optical device has an overall transmissivity ($T$) described by $$T = \cos^2(\theta_3-\theta_2-\theta_1)\cos^2(\theta_2-[\alpha'+\theta_1])+\sin^2(\theta_3-\theta_2+\theta_1)\sin^2(\theta\pi\iota_2-[\alpha'+\theta_1]).$$

2. An optical device which reflects a linearly polarized input beam of electromagnetic radiation and has reflectivity characteristics which depend upon the intensity of the input beam comprising:

a linear polarizer for transmitting that component of the input beam which is polarized along a preselected axis with its allowed axis at the same orientation as the direction of the polarization of the input beam;

a first quarter waveplate with its fast axis oriented at an angle $\theta$ to the direction of polarization of the input beam for elliptically polarizing that component of the input beam which is passed by the linear polarizer to produce an elliptically polarized beam having a major and a minor axis of polarization;

a cell containing liquid dielectric material which rotates the orientation of the axes of the polarization ellipse by an angle $\alpha''$ which is dependent upon the intensity of the input beam to produce a rotated elliptically polarized beam;

a second quarter waveplate with its fast axis oriented at an angle $\theta_2$ to the direction of polarization of the input beam for further altering the polarization state of the rotated elliptically polarized beam which emits an altered polarization beam; and a fully reflecting mirror for reflecting the altered polarization beam emitted by the second waveplate so that the beam passes in order through the second waveplate, the liquid dielectric, the first waveplate and the linear polarizer so that the optical device has an overall reflectivity ($R$) described by:

$$R = 1-\cos^2 2\theta_1 \sin^2 2(\theta_2-\alpha''\theta_1).$$

3. A method of producing an output beam of linearly polarized radiation including the steps of:

providing an input beam of electromagnetic radiation;

converting the input beam to an elliptically polarized beam;

rotating the orientation of the polarized beam in an amount which depends upon the intensity of the polarized beam to produce a rotated elliptically polarized beam;

altering the polarization of the rotated beam; and passing only that component of the altered polarization beam which lies along a preselected axis of polarization whereby the output beam is a polarized beam of radiation whose intensity is a nonlinear function of the intensity of the input beam.

4. A method of providing an output beam of polarized radiation including the steps of:

providing an input beam of electromagnetic radiation;

converting the input beam to an elliptically polarized beam;

rotating the orientation of the polarized beam in an amount which depends upon the intensity of the polarized beam to produce a rotated elliptically polarized beam;

altering the polarization of the rotated beam and reversing the direction of travel;

further rotating the orientation of the polarized beam in an amount which depends upon the intensity of the polarized beam to produce a further rotated elliptically polarized beam;

further altering the polarization of the beam; and selecting a component of linear polarization from the beam whereby the output beam is a polarized beam of radiation whose intensity is a nonlinear function of the intensity of the input beam.

* * * * *

UNITED STATES PATENT OFFICE
CERTIFICATE OF CORRECTION

Patent No. 3,700,307          Dated October 24, 1972

Inventor(s) William H. Glenn

It is certified that error appears in the above-identified patent and that said Letters Patent are hereby corrected as shown below:

Column 4, Line 10, change "$\alpha = 2(\pi\omega)/(cn) BE_{xy} L_2$" to $\alpha = 2\pi\omega BE_x E_y L/(cn)$ Line 57, change "$\sin(^2\theta_3 - \theta_2 + \theta$" to $\sin^2(\theta_3 - \theta_2 + \theta_1)$ Line 58, change "$_1) \sin^2(\theta \pi \iota_2 - [\alpha' + \theta_1])$" to $\sin^2(\theta_2 - [\alpha' + \theta_1])$ Line 60, change "$\alpha' = ((2\pi)^2)/(\lambda) LBE_0^2 \sin 2\theta_1$" to $\alpha' = \frac{(2\pi)^2}{\lambda} LBE_0^2 \sin 2\theta_1$ Column 5, Line 51, change "$\alpha'' = ((2\pi)^2)/(\lambda) LBE_0^2 \sin 2\theta_1$" to $\alpha'' = \frac{(2\pi)^2}{\lambda} LBE_0^2 \sin 2\theta_1$ Column 6, Line 17 and 18 change "$\theta_2 - \theta_1 = (\pi)/(2a)$" to $\theta_2 - \theta_1 = \pi/2$ Line 46, change "6943 A" to 6943 Å

Line 56, change "$EE_0^2$" to $E_0^2$

Column 7, Line 21, change "$\alpha$" to $\alpha'$

Line 34, change "$\sin(^2\theta_3 - \theta_2 + \theta$" to $\sin^2(\theta_3 - \theta_2 + \theta_1)$ Line 35, change "$_1)\sin^2(\theta \pi \iota_2$" to $\sin^2(\theta_2$ Signed and sealed this 3rd day of April 1973.

(SEAL)
Attest:

EDWARD M. FLETCHER, JR.          ROBERT GOTTSCHALK
Attesting Officer          Commissioner of Patents